No. 751,990. Patented February 9, 1904.

UNITED STATES PATENT OFFICE.

JOHN McGLASHAN, OF CAWNPORE, INDIA.

PROCESS OF MAKING SUGAR.

SPECIFICATION forming part of Letters Patent No. 751,990, dated February 9, 1904.

Application filed February 16, 1903. Serial No. 143,655. (No specimens.)

*To all whom it may concern:*

Be it known that I, JOHN McGLASHAN, a subject of the King of Great Britain and Ireland and Emperor of India, and a resident of Cawnpore, India, (whose postal address is Cawnpore, India,) have invented a certain Improved Process of Making Sugar, (for which I have applied for British Patent No. 23,779, dated October 31, 1902,) of which the following is a specification.

This invention has for its object an improved process for removing invert sugar from sugar solutions, cane-juices, or molasses, so as thereby to raise the standard of purity of the liquors treated and increase the yield and improve the quality of the sugar crystals obtained.

In the ordinary process of manufacturing raw sugar the cane-juices are extracted either by crushing or diffusion. The juice is made neutral by adding to it either milk of lime, lime-water, or their alkaline equivalents (milk of lime being more generally used) and is then heated to remove albuminoid matters, the latter process being technically known as "defecation." The clear juice is then concentrated by boiling, either in open pans or in a vacuum apparatus. When the vacuum process is used, there are two concentrations *in vacuo* as a rule—first, in a multiple-effect apparatus, concentrating the juice to a thin syrup, and finally in a vacuum-pan, in which the sugar crystals are formed. These crystals are then separated from the molasses about them either by draining or in a centrifugal machine.

I have found that the addition of a pure culture of an organism or mixture of organisms which have not the power of inverting saccharose (cane-sugar) or have that power only in a small degree, but have the power of decomposing invert sugar into alcohol and carbonic acid, have a beneficial effect by improving the quality and increasing the quantity of the output. The organisms which may be used are non-inverting or slightly-inverting yeast-like bodies. There are many species of those bodies, varying much in appearance when seen under a microscope. Among them may be mentioned organisms of the saccharomycetes, schizosaccharomycetes, saccharomyces apiculatus, and forula types. These organisms have at present in the majority of cases no bacteriological name whereby they can be distinguished, and they can only be ascertained experimentally. Among those which have to a certain extent been investigated and have been found suitable for the purposes of this invention may be mentioned saccharomyces octosporus. An organism of any of the above types having very weak inverting powers may also be used; but the use of such an organism will result in loss of crystallizable sugar in quantities varying with its inverting powers. The powers of these non-inverting organisms vary considerably, and in selecting the organism to be used regard will have to be paid to the percentage of invert sugar in the solution to be fermented—that is, the organisms should be such that when they have produced their maximum amount of alcohol, and thereby stopped further fermentation, the invert sugar should all have been decomposed into, chiefly, alcohol and carbon dioxid. I have found that a solution containing not more than six per cent. of invert sugar to be a convenient strength. This point is regulated by analysis and trial. During the fermentation it is preferable that the solution should be kept neutral or as nearly so as possible. In a strong fermentation bacteria which have escaped the sterilizing process will be suppressed; but should the organisms selected for the removal of the invert sugar become strongly contaminated with bacteria or "wild yeasts" new and pure cultures for "pitching" must be used, which may be prepared by any known process. When the fermentation is complete, the alcohol is distilled off and recovered.

The pure culture of the ferment may be prepared by Hansen's method, which, briefly, is as follows: The impure yeast is diluted largely with sterile water. A drop or two of this diluted impure ferment is introduced into "agar-agar" or into gelatin-jelly containing a nutrient medium, such as raw cane-sugar. The position of the individual cells is then marked down by microscopical examination. Colonies are allowed to develop, and when large enough to be distinctly visible to the eye they are touched with a small piece of sterile platinum or copper wire. The wire is dropped into a small flask containing from ten to twenty cubic centimeters of a suitable nutrient medium and allowed to ferment. The small culture thus obtained by Hansen's method is next grown in a Pasteur flask in about one hundred cubic centimeters of sterile raw cane-sugar solution or other suitable medium. This larger culture after fermentation is over is in turn transferred to a larger flask containing one thousand to two thousand cubic centimeters of a suitable sterile solution. In this way and by using Hansen and Kuehle's known apparatus for supplying pure brewery yeasts large cultures may be obtained.

In practice I prefer to treat solutions of raw cane-sugar or concentrated sugar-cane juice of about 1.25 specific gravity. To start a fermentation in this, I mix it with one-tenth to one-fifteenth of its bulk of a solution in which the fermentation is complete. This sets up fermentation in the new liquor, which will be complete in from four to six days, provided the invert sugar does not exceed six per cent., as hereinbefore stated. I prefer to let these ferments act at a temperature of 20° to 25° centigrade, though these temperatures may vary considerably without in any way affecting the action of the ferment.

This process for removing invert sugar might be introduced at any of the following stages of the manufacture: at the juice stage after the crushing or diffusion processes and before the defecating process, after defecation, after concentration in open pans to a density below that at which the concentrated liquor will deposit crystals when allowed to cool, after evaporation in the multiple-effect apparatus and before the final vacuum process which reduces the syrup to crystals and molasses; also, if desired, it might be applied to the molasses separated from the sugar crystals. In the last case the molasses is diluted with water, fermented, the alcohol distilled off and recovered, and the liquors coming from the still (molasses liquors) treated by any known process of filtration or clarification and concentrated to obtain the sugar.

Owing to the ready manner in which bacteria develop in the juices before or after defecation and to the large volumes of liquid to be treated and distilled for the recovery of alcohol I prefer to introduce the pure cultures after the juices have been concentrated until they contain about fifty per cent. of solids. This in a large factory working multiple evaporating apparatus would be after the evaporation of the defecated juice in the "multiple effect." The syrup would be cooled and preferably aerated, "pitched" with suitable organisms, and fermented to remove the invert sugar. It is then distilled to recover the alcohol and the remaining liquor treated, preferably by heating or boiling with lime, to remove any organic matters it may contain. The lime precipitate with organic matters held in suspension could be removed by filtering and any excess of lime removed by treating the filtered liquid with carbonic acid. After the excess of lime has been removed the liquor may be treated in the ordinary manner—that is, by boiling—to form crystals and then separating the molasses.

The above invention does not only apply to the manufacture of raw sugar, but the process may also be employed in the refining processes now in use. In a sugar refinery the raw sugars are dissolved in water, usually with the aid of heat, and then filtered to remove all insoluble matters and the filtered liquors passed over granulated animal charcoal to remove any coloring-matters that may be present. The clear liquors are then boiled in a vacuum-pan until crystals are formed and the molasses afterward separated therefrom in centrifugal machines. Should the raw sugars to be refined contain invert sugar, the sugar solution may be treated with the above-mentioned organisms to decompose the invert sugar into alcohol, the alcohol being distilled off and the usual refining process continued. Again, the ferments might be introduced after filtration or even after passing over the animal charcoal, though I prefer not to employ it at this stage.

Refinery molasses, again, might be treated in the same manner as described for the factory molasses, the molasses being treated with non-inverting yeast-like organisms distilled to separate the alcohol, lime then being added and the product finally refined in the usual manner.

The expression "pitching" used in this specification is a common technical brewing term. It means simply the mixing of the sugar liquor with any of the yeasts mentioned. It is a kind of seeding of the liquor with yeast or a sowing of the yeast in the liquor in sufficient quantity to produce the desired result.

When concentrated solutions are used, the fermentation should be assisted by mechanical agitation.

In the claims, while I have used the term "saccharomycetes," I wish it to be understood in view of the specification that such term has not a limited meaning; but I consider it broad enough to cover its equivalents—namely, schizosaccharomycetes, saccharomyces apeculatus, and forula types.

What I claim as my invention is—

1. As an improvement in the process of making sugar, "pitching" a sugar-containing solution in which is both cane-sugar and invert sugar, with a yeast-like organism which has substantially no power of inverting saccharose, but has the power of decomposing the invert sugar into alcohol and carbonic acid, substantially as herein set forth.

2. As an improvement in the process of making sugar, "pitching" a sugar-containing solution in which is cane-sugar and not more than six per cent. of invert sugar, with a yeast-like organism which has substantially no power of inverting saccharose, but has the power of decomposing the invert sugar into alcohol and carbonic acid, substantially as herein set forth.

3. As an improvement in the process of making sugar, "pitching" a sugar-containing solution in which is both cane-sugar and invert sugar, with a yeast-like organism which has substantially no power of inverting saccharose, but has the power of decomposing the invert sugar into alcohol and carbonic acid, before the final concentration to crystals and molasses, fermenting the solution containing the mixed sugars and driving off the alcohol produced, substantially as described.

4. As an improvement in the process of making sugar, "pitching" a sugar-containing solution in which is both sugar and invert sugar, with an organism which is of the non-inverting saccharomycetes type, fermenting the solution containing the mixed sugars, and driving off the alcohol produced, substantially as described.

In testimony whereof I have signed my name to this specification in the presence of two subscribing witnesses.

JOHN McGLASHAN.

Witnesses:
E. M. COLEMAN,
ZANIAL ABDIN.